(12) United States Patent
Takeshima et al.

(10) Patent No.: US 10,457,551 B2
(45) Date of Patent: *Oct. 29, 2019

(54) HEAT AND HYDROGEN GENERATION DEVICE WITH ECU CONTROLLING AIR FEED DEVICE

(71) Applicant: TOYOTA JIDOSHA KABUSHIKI KAISHA, Toyota-shi, Aichi-ken (JP)

(72) Inventors: Shinichi Takeshima, Numazu (JP); Hiromasa Nishioka, Susono (JP); Kiyoshi Fujiwara, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 77 days.

This patent is subject to a terminal disclaimer.

(21) Appl. No.: 15/635,756

(22) Filed: Jun. 28, 2017

(65) Prior Publication Data

US 2018/0002175 A1 Jan. 4, 2018

(30) Foreign Application Priority Data

Jul. 4, 2016 (JP) .................................. 2016-132334

(51) Int. Cl.
 *C01B 3/38* (2006.01)
(52) U.S. Cl.
 CPC ................ *C01B 3/38* (2013.01); *C01B 3/386* (2013.01); *C01B 2203/0261* (2013.01);
 (Continued)
(58) Field of Classification Search
 CPC .......... B01J 19/0013; B01J 2208/00061; B01J 2208/00504; B01J 2219/00191;
 (Continued)

(56) References Cited

U.S. PATENT DOCUMENTS 4,033,133 A 7/1977 Houseman et al.
5,885,727 A 3/1999 Kawatsu
(Continued)

FOREIGN PATENT DOCUMENTS

JP 2003-238109 A 8/2003
JP 2006-117468 A 5/2006
(Continued)

OTHER PUBLICATIONS

J. Bonadies et al., "Application of a Diesel Fuel Reformer for Tier 2 Bin 5 Emissions," DELPHI, 2006 DEER Conference (Aug. 21, 2006).

(Continued)

*Primary Examiner* — Imran Akram
(74) *Attorney, Agent, or Firm* — Finnegan, Henderson, Farabow, Garrett & Dunner, LLP

(57) ABSTRACT

A burner combustion chamber (3), a reformer catalyst (4) to which burner combustion gas is fed, and a heat exchange part (13a) for heating the air fed to the burner (7) are provided. When the temperature of the reformer catalyst (4) exceeds the allowable catalyst temperature (TX) or when it is predicted the temperature of the reformer catalyst (4) will exceed the allowable catalyst temperature (TX), the air circulation route for guiding air to the burner (7) is switched from a high temperature air circulation route (13) for guiding air heated by the heat exchange part (13a) to the burner (7) to a low temperature air circulation route (14) for guiding air not flowing within the heat exchange part (13a) and lower in temperature than the air heated at the heat exchange part (13a) to the burner (7).

9 Claims, 10 Drawing Sheets

(52) U.S. Cl.
CPC ............ C01B 2203/0811 (2013.01); C01B 2203/0883 (2013.01); C01B 2203/169 (2013.01); C01B 2203/1614 (2013.01); C01B 2203/1619 (2013.01)

(58) Field of Classification Search
CPC ............ B01J 8/0278; B01J 2219/00238; B01J 8/0285; B01J 8/0496; H01M 8/04022; H01M 8/04007; C01B 2203/0244; C01B 2203/0811; C01B 2203/169; C01B 2203/00; C01B 2203/0883; C01B 2203/1695; C01B 3/38; C01B 2203/0227; C01B 2203/0822; C01B 2203/1276; C01B 2203/16; C01B 2203/1614; C01B 2203/1685; C01B 3/363
See application file for complete search history.

(56) References Cited

U.S. PATENT DOCUMENTS

| | | | |
|---|---|---|---|
| 6,472,092 | B1 | 10/2002 | Matsuda et al. |
| 2002/0006535 | A1* | 1/2002 | Woods .................. F23D 11/443 429/411 |
| 2003/0200699 | A1 | 10/2003 | Robb |
| 2003/0235732 | A1* | 12/2003 | Haltiner, Jr. ...... H01M 8/04022 429/440 |
| 2004/0043266 | A1* | 3/2004 | Oma .......................... F28B 1/00 429/423 |
| 2004/0043343 | A1* | 3/2004 | Kamijo .............. B01D 53/8625 431/2 |
| 2004/0081593 | A1 | 4/2004 | Docter et al. |
| 2004/0144030 | A1 | 7/2004 | Smaling |
| 2005/0089732 | A1 | 4/2005 | Aoyama et al. |
| 2005/0217178 | A1 | 10/2005 | Aoyama |
| 2006/0037308 | A1 | 2/2006 | Kamijo et al. |
| 2008/0145726 | A1* | 6/2008 | Nagasaka ................. C01B 3/46 48/61 |
| 2008/0244975 | A1* | 10/2008 | Johnston ................ B01J 19/249 48/197 FM |
| 2010/0275582 | A1* | 11/2010 | Wada .................... B01D 53/944 60/276 |
| 2010/0285377 | A1* | 11/2010 | Tamura .................... C01B 3/384 429/423 |
| 2011/0212375 | A1* | 9/2011 | Taguchi ..................... C01B 3/38 429/425 |
| 2011/0223099 | A1* | 9/2011 | Nakamura ............... C01B 3/384 423/648.1 |
| 2012/0045701 | A1* | 2/2012 | Braun ............... H01M 8/04022 429/423 |
| 2013/0302708 | A1* | 11/2013 | Kamijo ............. H01M 8/04619 429/423 |
| 2015/0099812 | A1* | 4/2015 | Kelly ....................... B01J 8/062 518/703 |
| 2016/0023899 | A1 | 1/2016 | Hirakawa et al. |
| 2016/0263523 | A1* | 9/2016 | Van Dyke ............. B01D 53/78 |

FOREIGN PATENT DOCUMENTS

| | | |
|---|---|---|
| JP | 2012-12952 | 1/2012 |
| KR | 10-20040079991 A | 9/2004 |

OTHER PUBLICATIONS

M. Takiguchi et al., "'Catalytic Engine' NOx Reduction of Diesel Engines with New Concept Onboard Ammonia Synthesis System," SAE Technical Paper Series 920469, pp. 131-138 (Feb. 24-28, 1992).

Final Office Action issued in U.S. Appl. No. 15/635,616 dated May 20, 2019.

Advisory Action issued in U.S. Appl. No. 15/635,616 dated Jul. 12, 2019.

Office Action issued in U.S. Appl. No. 15/635,616 dated Aug. 2, 2019.

* cited by examiner

FIG. 2

REFORMING REACTION OF DIESEL FUEL

LHV NOTATION (a) COMPLETE OXIDATION REACTION
$CH_{1.83} + 1.4575 O_2 \rightarrow CO_2 + 0.915 H_2O, \Delta H^0 = -600 kJ/mol\text{-}C$ (b) PARTIAL OXIDATION REFORMING REACTION
$CH_{1.83} + 0.5 O_2 \rightarrow CO + 0.915 H_2, \Delta H^0 = -86 kJ/mol\text{-}C$ (c) STEAM REFORMING REACTION
$CH_{1.83} + H_2O \rightarrow CO + 1.915 H_2, \Delta H^0 = +146 kJ/mol\text{-}C$ (d) WATER GAS SHIFT REACTION
$CO + H_2O \rightarrow CO_2 + H_2, \Delta H^0 = -41 kJ/mol\text{-}C$

FIG. 3

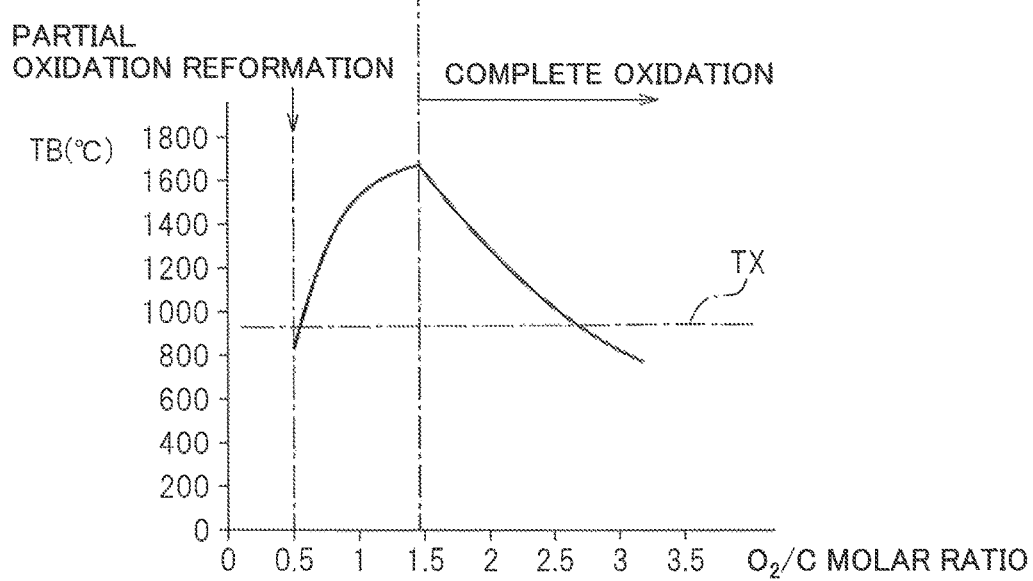

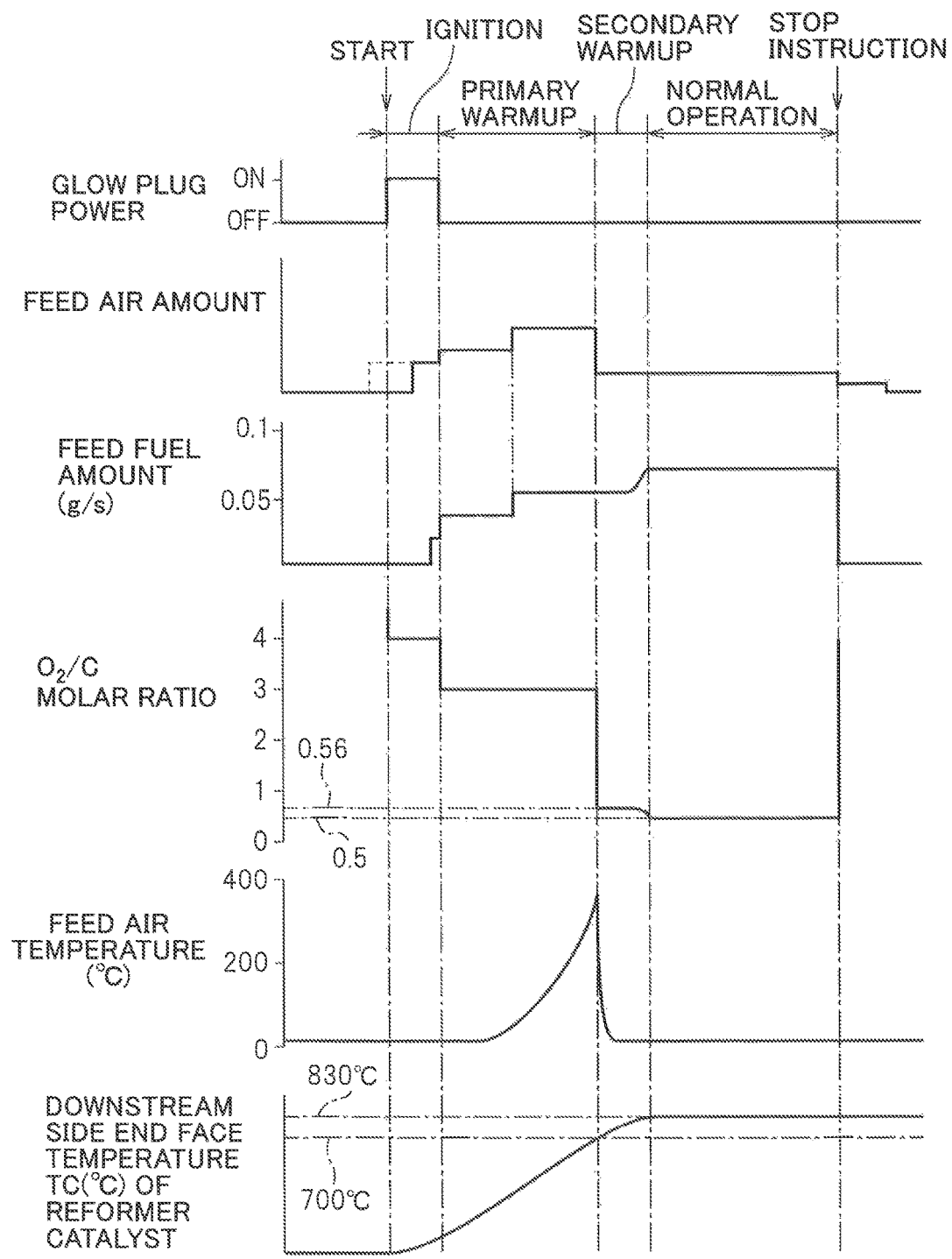

HEAT AND HYDROGEN GENERATION DEVICE WITH ECU CONTROLLING AIR FEED DEVICE

TECHNICAL FIELD

The present invention relates to a heat and hydrogen generation device.

BACKGROUND ART

Known in the art is a heat and hydrogen generation device provided with a burner having a burner combustion chamber and a fuel injection port for injecting fuel inside the burner combustion chamber, an air feed device for feeding air inside the burner combustion chamber, and a reformer catalyst and designed to feed burner combustion gas produced in the burner combustion chamber to the reformer catalyst to thereby generate heat and hydrogen (for example, see "Application of a Diesel Fuel Reformer for Tier 2 Bin 5 Emissions" Delphi, 2006 DEER Conference, Aug. 21, 2006 Detroit, Mich.). In this heat and hydrogen generation device, to cause a partial oxidation reforming reaction, air and fuel are made to react in a state where the $O_2/C$ molar ratio of the air and fuel is maintained at 0.5, and whereby heat is made to be generated and hydrogen is made to be produced.

SUMMARY OF INVENTION

Technical Problem

In this regard, when performing a partial oxidation reforming reaction of fuel by using a reformer catalyst, the temperature of the reformer catalyst when the partial oxidation reforming reaction reaches an equilibrium state, that is, the reaction equilibrium temperature, changes depending on the $O_2/C$ molar ratio of the air and fuel. For example, when the $O_2/C$ molar ratio is 0.5, the temperature of the reformer catalyst, that is, the reaction equilibrium temperature, becomes about 830° C. However, the temperature of this reformer catalyst is the value in the case where the temperature of the air fed is 25° C. If the temperature of the air fed rises, the temperature of the reformer catalyst rises along with that.

In this regard, however, in the above-mentioned heat and hydrogen generation device, the air which is fed is heated constantly by the gas flowing out from the reformer catalyst. Therefore, if the heating action of the gas flowing out from the reformer catalyst causes the temperature of the air fed to rise, the temperature of the reformer catalyst rises. If the temperature of the reformer catalyst rises, the temperature of the gas flowing out from the reformer catalyst rises and the temperature of the air fed rises, so the temperature of the air fed continues to rise. As a result, the problem arises that the temperature of the reformer catalyst becomes higher and the reformer catalyst degrades due to the heat.

Solution to Problem

According to the present invention, to solve this problem, there is provided a heat and hydrogen generation device comprising a burner combustion chamber, a burner arranged in the burner combustion chamber for performing burner combustion, a fuel feed device able to control an amount of feed of fuel fed from the burner into the burner combustion chamber, an air feed device able to control a temperature and amount of feed of air fed from the burner into the burner combustion chamber, an ignition device for causing the fuel to ignite, a reformer catalyst to which burner combustion gas is fed, and an electronic control unit, the air feed device being provided with a heat exchange part for heating the air fed from the burner into the burner combustion chamber by the burner combustion gas, heat and hydrogen being generated by performing the burner combustion, wherein an allowable catalyst temperature enabling heat degradation of the reformer catalyst to be avoided is set in advance, and the electronic control unit controls the air feed device to lower the temperature of the air fed from the burner into the burner combustion chamber for maintaining the temperature of the reformer catalyst at below the allowable catalyst temperature when the burner combustion is being performed and when the temperature of the reformer catalyst exceeds the allowable catalyst temperature or it is predicted that the temperature of the reformer catalyst will exceed the allowable catalyst temperature.

Advantageous Effects of Invention

By lowering the temperature of the air fed into the burner combustion chamber when the temperature of the reformer catalyst exceeds the allowable catalyst temperature or when it is predicted that the temperature of the reformer catalyst will exceed the allowable catalyst temperature, the temperature of the reformer catalyst is kept from excessively rising and therefore the reformer catalyst is kept from degrading due to heat.

BRIEF DESCRIPTION OF DRAWINGS

FIG. 2 is a view for explaining reforming reactions of diesel fuel.

FIG. 3 is a view showing a relationship of a reaction equilibrium temperature TB and an $O_2/C$ molar ratio.

FIG. 7 is a time chart showing heat and hydrogen generation control.

DESCRIPTION OF EMBODIMENTS

Figure 1:
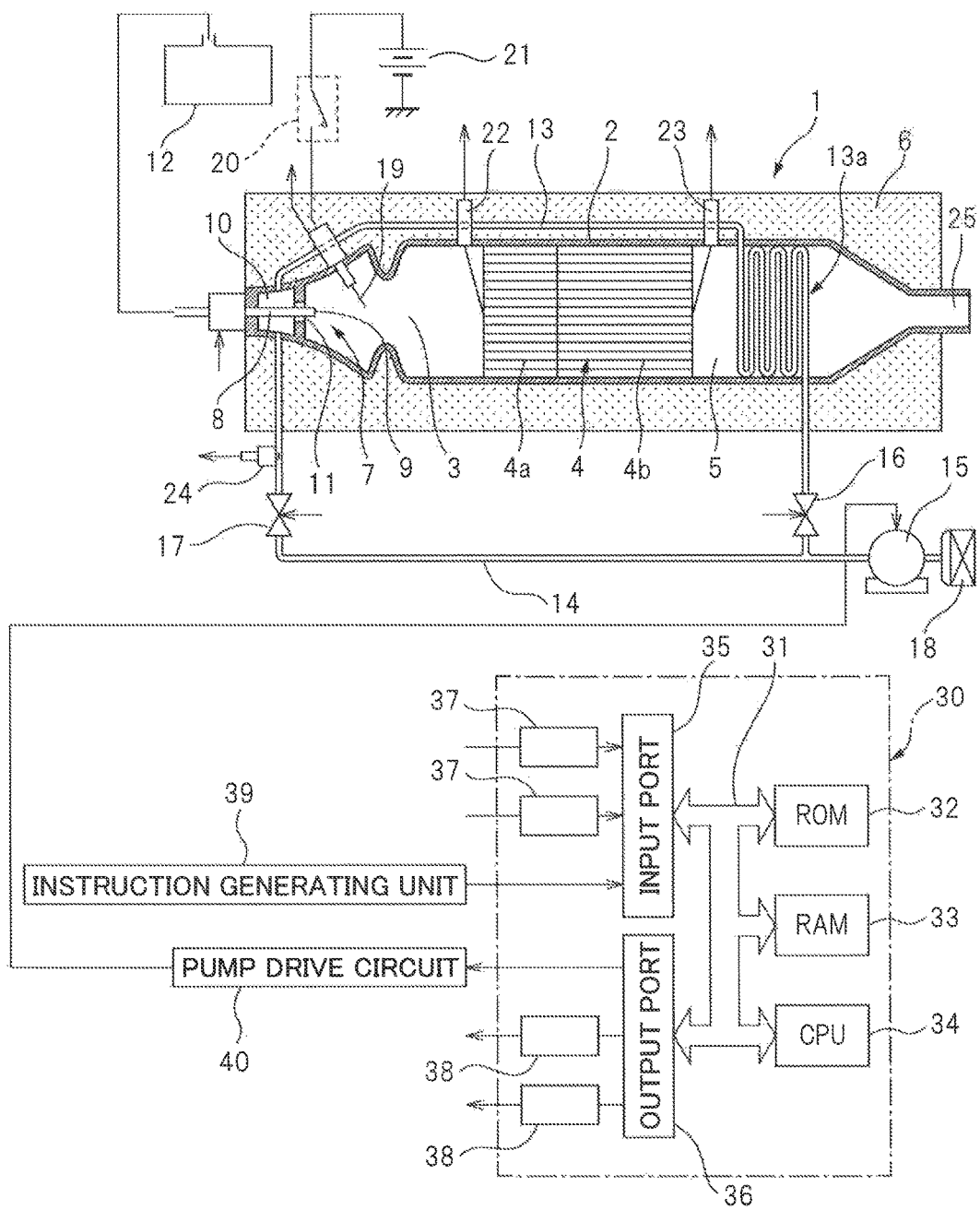
FIG. 1 is an overall view of a heat and hydrogen generation device.

FIG. 1 is an overall view of a heat and hydrogen generation device 1. This heat and hydrogen generation device 1 is cylindrically shaped as a whole. Referring to FIG. 1, 2 indicates a cylindrical housing of the heat and hydrogen generation device 1, 3 a burner combustion chamber formed in the housing 2, 4 a reformer catalyst arranged in the housing 2, and 5 a gas outflow chamber formed in the housing. In the embodiment shown in FIG. 1, the reformer catalyst 4 is arranged at the center of the housing 2 in the longitudinal direction, the burner combustion chamber 3 is arranged at one end part of the housing 2 in the longitudinal direction, and the gas outflow chamber 5 is arranged at the other end part of the housing 2 in the longitudinal direction. As shown in FIG. 1, in this embodiment, the entire outer circumference of the housing 2 is covered by a heat insulating material 6.

As shown in FIG. 1, a burner 7 provided with a fuel injector 8 is arranged at one end part of the burner combustion chamber 3. The tip of the fuel injector 8 is arranged in the burner combustion chamber 3, and a fuel injection port 9 is formed at the tip of the fuel injector 8. Further, an air chamber 10 is formed around the fuel injector 8, and an air feed port 11 for ejecting air in the air chamber 10 toward the inside of the burner combustion chamber 3 is formed around the tip of the fuel injector 8. In the embodiment shown in FIG. 1, the fuel injector 8 is connected to a fuel tank 12, and fuel inside the fuel tank 12 is injected from the fuel injection port 9 of the fuel injector 8. In the embodiment shown in FIG. 1, this fuel is comprised of diesel fuel.

The air chamber 10 is connected on one hand through a high temperature air flow passage 13 to an air pump 15 able to control the discharge rate and is connected on the other hand through a low temperature air flow passage 14 to the air pump 15 able to control the discharge rate. As shown in FIG. 1, a high temperature air valve 16 and low temperature air valve 17 are arranged in the high temperature air flow passage 13 and the low temperature air flow passage 14, respectively. Further, as shown in FIG. 1, the high temperature air flow passage 13 is provided with a heat exchange part arranged in the gas outflow chamber 5. This heat exchange part is shown diagrammatically in FIG. 1 by reference notation 13a. Note that, this heat exchange part may also be formed downstream of the reformer catalyst 4 around the housing 2 defining the gas outflow chamber 5. That is, it is preferable that this heat exchange part 13a is arranged or formed at a location where a heat exchange action is performed using the heat of the high temperature gas flowing out from the gas outflow chamber 5. On the other hand, the low temperature air flow passage 14 does not have the heat exchange part 13a performing the heat exchange action using the heat of the high temperature gas flowing out from the gas outflow chamber 5 in this way.

If the high temperature air valve 16 opens and the low temperature air valve 17 is made to close, the outside air is fed through the air cleaner 18, air pump 15, high temperature air flow passage 13, and air chamber 10 into the burner combustion chamber 3 from the air feed port 11. At this time, the outside air, that is, air, is made to flow within the heat exchange part 13a. As opposed to this, if the low temperature air valve 17 opens and the high temperature air valve 16 is made to close, the outside air, that is, the air, is fed through the air cleaner 18, air pump 15, low temperature air flow passage 14, and air chamber 10 from the air feed port 11. Therefore, the high temperature air valve 16 and low temperature air valve 17 form a switching device able to switch the air flow passage for feeding air through the air chamber 10 to the air feed port 11 between the high temperature air flow passage 13 and the low temperature air flow passage 14.

On the other hand, an ignition device 19 is arranged in the burner combustion chamber 3. In the embodiment shown in FIG. 1, this ignition device 19 is comprised of a glow plug. This glow plug 19 is connected through a switch 20 to a power supply 21. On the other hand, in the embodiment shown in FIG. 1, the reformer catalyst 4 is comprised of an oxidizing part 4a and a reforming part 4b. In the example shown in FIG. 1, the substrate of the reformer catalyst 4 is comprised of zeolite. On this substrate, at the oxidizing part 4a, mainly palladium Pd is carried, while at the reforming part 4b, mainly rhodium Rh is carried. Further, a temperature sensor 22 for detecting the temperature of the upstream side end face of the oxidizing part 4a of the reformer catalyst 4 is arranged in the burner combustion chamber 3, and a temperature sensor 23 for detecting the temperature of the downstream side end face of the reforming part 4b of the reformer catalyst 4 is arranged in the gas outflow chamber 5. Furthermore, a temperature sensor 24 for detecting the temperature of the air flowing within the low temperature air flow passage 14 is arranged in the low temperature air flow passage 14 positioned at the outside of the heat insulating material 6.

As shown in FIG. 1, the heat and hydrogen generation device 1 is provided with an electronic control unit 30. This electronic control unit 30 is comprised of a digital computer provided with, as shown in FIG. 1, a ROM (read only memory) 32, RAM (random access memory) 33, CPO (microprocessor) 34, input port 35, and output port 36, which are interconnected, with each other by a bidirectional bus 31. The output signals of the temperature sensors 22, 23, and 24 are input through corresponding AD converters 37 to the input port 35 respectively. Further, an output signal showing the resistance value of the glow plug 19 is input through a corresponding AD converter 37 to the input port 35. Furthermore, various instructions from the instruction generating part 39 generating various types of instructions are input to the input port 35.

On the other hand, the output port 36 is connected through corresponding drive circuits 38 to the fuel injectors 8, high temperature air valve 16, low temperature air valve 17, and switch 20. Furthermore, the output port 36 is connected to a pump drive circuit 40 controlling the discharge rate of the air pump 15. The discharge rate of the air pump 15 is controlled by this pump drive circuit 40 so as to become the instructed value of the discharge rate which is output to the output port 36.

At the time of start of operation of the heat and hydrogen generation device 1, fuel injected from the burner 7 is ignited by the glow plug 19. Due to this, the fuel and air which are fed from the burner 7 react in the burner combustion chamber 3, and whereby burner combustion is started. If burner combustion is started, the temperature of the reformer catalyst 4 gradually rises. At this time, the burner combustion is performed under a lean air-fuel ratio. Next, if the temperature of the reformer catalyst 4 reaches a temperature able to reform the fuel, the air-fuel ratio is switched from the lean air-fuel ratio to the rich air-fuel ratio and the reforming action of the fuel at the reformer catalyst 4 is started. If the reforming action of the fuel is started, hydrogen is generated and high temperature gas containing the generated hydrogen is made to flow out from a gas outflow port 25 of the gas outflow chamber 5.

That is, in an embodiment of the present invention, the heat and hydrogen generation device 1 is provided with the burner combustion chamber 3, the burner 7 arranged in the burner combustion chamber 3 for performing burner combustion, a fuel feed device able to control the amount of feed of the fuel fed from the burner 7 into the burner combustion chamber 3, an air-feed device able to control the temperature and amount of feed of air fed from the burner 7 into the burner combustion chamber 3, the ignition device 19 for making the fuel ignite, the reformer catalyst 4 to which the burner combustion gas is fed, and the electronic control unit 30, and the air feed device is provided with the heat exchange part 13a for heating the air fed from the burner 7 into the burner combustion chamber 3 by the burner combustion gas.

In this case, in the embodiment of the present invention, the fuel injector 8 forms the above-mentioned fuel feed device. The air chamber 10, air feed port 11, high temperature air flow passage 13, heat exchange part 13a, low temperature air flow passage 14, air pump 15, high temperature air valve 16, and low temperature air valve 17 form the above-mentioned air feed device. Further, in the embodiment of the present invention, heat and hydrogen are generated by performing the burner combustion in the heat and hydrogen generation device 1.

The hydrogen generated by the heat and hydrogen generation device 1 is used for example for warming up the exhaust purification catalyst of a vehicle. In this case, the heat and hydrogen generation device 1 is for example arranged inside the engine compartment of the vehicle. Of course, the hydrogen generated by the heat and hydrogen generation device 1 is used for various other applications as well. Whatever the case, in the heat and hydrogen generation device 1, hydrogen is generated by reforming fuel. Therefore, first, referring to FIG. 2, reforming reactions in the case of using diesel fuel as fuel will be explained.

(a) to (c) in FIG. 2 show a reaction formula when a complete oxidation reaction is performed, a reaction formula when a partial oxidation reforming reaction is performed, and a reaction formula when a steam reforming reaction is performed, respectively, with reference to the case of using the generally used diesel fuel as fuel. Note that, the heating value $\Delta H^0$ in the reaction formulas are shown by the lower heating value (LHV). Now, as will be understood from (b) and (c) in FIG. 2, to generate hydrogen from diesel fuel, there are two methods: the method of performing the partial oxidation reforming reaction and the method of performing the steam reforming reaction. The steam reforming reaction is the method of adding steam to diesel fuel, and as will be understood from (C) in FIG. 2, this steam reforming reaction is an endothermic reaction. Therefore, to cause the steam reforming reaction, it is necessary to add heat from the outside. In large scale hydrogen generating plants, usually, to raise the efficiency of generation of hydrogen, in addition to the partial oxidation reforming reaction, the steam reforming reaction in which the generated heat is not discarded, but using the generated heat for generating hydrogen is used.

As opposed to this, in the present invention, to generate both hydrogen and heat, the steam reforming reaction using the generated heat for generating hydrogen is not used. In the present invention, only the partial oxidation reforming reaction is used to generate hydrogen. This partial oxidation reforming reaction, as will be understood from (b) in FIG. 2, is an exothermic reaction. Therefore, the reforming reaction proceeds by the heat generated on its own even without adding heat from the outside, and hydrogen is generated. Now, as shown by the reaction formula of the partial oxidation reforming reaction of (b) in FIG. 2, the partial oxidation reforming reaction is performed by a rich air-fuel ratio in which an $O_2/C$ molar ratio, showing the ratio of the air and fuel which are made to react, is 0.5. At this time, CO and $H_2$ are generated.

FIG. 3 shows the relationship between a reaction equilibrium temperature TB when the air and fuel are reacted at the reformer catalyst and reach equilibrium and the $O_2/C$ molar ratio of the air and fuel. Mote that, the solid line in FIG. 3 shows the theoretical value when the air temperature is 25° C. As shown by the solid line in FIG. 3, when the partial oxidation reforming reaction is performed by a rich air-fuel ratio of an $O_2/C$ molar ratio=0.5, the equilibrium reaction temperature TB becomes substantially 830° C. Note that, the actual equilibrium reaction temperature TB at this time becomes somewhat lower than 830° C., but below, the equilibrium reaction temperature TB will be explained for an embodiment according to the present invention as the value shown by the solid line in FIG. 3.

On the other hand, as will be understood from the reaction formula of the complete oxidation reaction of (a) in FIG. 2, when the $O_2/C$ molar ratio=1.4575, the ratio of the air and fuel becomes the stoichiometric air-fuel ratio. As shown in FIG. 3, the reaction equilibrium temperature TB becomes the highest when the ratio of the air and fuel becomes the stoichiometric air-fuel ratio. When an $O_2/C$ molar ratio is between 0.5 and 1.4575, partially the partial oxidation reforming reaction is performed, while partially the complete oxidation reaction is performed. In this case, the larger the $O_2/C$ molar ratio, the greater the ratio by which the complete oxidation reaction is performed compared with the ratio by which the partial oxidation reforming reaction is performed, so the larger the $O_2/C$ molar ratio, the higher the reaction equilibrium temperature TB.

Figure 4:
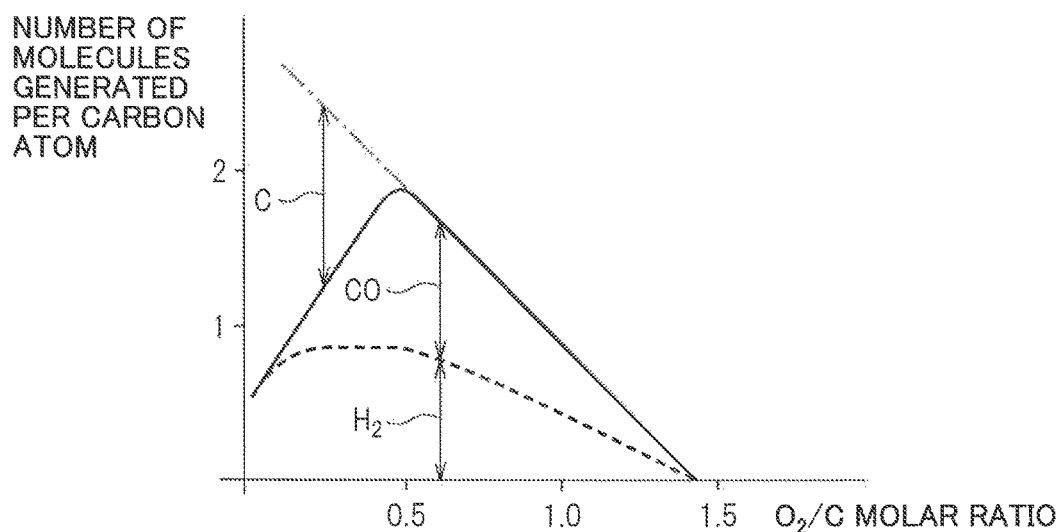
FIG. 4 is a view showing a relationship of an $O_2/C$ molar-ratio and a number of molecules generated per carbon atom.

On the other hand, FIG. 4 shows the relationship between the number of molecules ($H_2$ and CO) produced per atom of carbon and the $O_2/C$ molar ratio. As explained above, the more the $O_2/C$ molar ratio exceeds 0.5, the less the ratio by which the partial oxidation reforming reaction is performed. Therefore, as shown in FIG. 4, the more the $O_2/C$ molar ratio exceeds 0.5, the smaller the amounts of generation of $H_2$ and CO. Note that, while not described in FIG. 4, if the $O_2/C$ molar ratio becomes larger than 0.5, due to the complete oxidation reaction shown in (a) of FIG. 2, the amounts of generation of $CO_2$ and $H_2O$ increase. In this regard, FIG. 4 shows the amounts of generation of $H_2$ and CO when assuming no water gas shift reaction shown in FIG. 2(d) occurs. However, in actuality, the water gas shift reaction shown in (d) of FIG. 2 occurs due to the CO generated by the partial oxidation reforming reaction and the $H_2O$ generated by the complete oxidation reaction, and hydrogen is generated by this water gas shift reaction as well.

Now then, as explained above, the more the $O_2/C$ molar ratio exceeds 0.5, the less the amounts of generation of $H_2$ and CO. On the other hand, as shown in FIG. 4, if the $O_2/C$ molar ratio becomes smaller than 0.5, excess carbon C unable to be reacted with increases. This excess carbon C deposits inside the pores of the substrate of the reformer catalyst, that is, a coking occurs. If the coking occurs, the reforming ability of the reformer catalyst remarkably falls. Therefore, to avoid the coking occurring, the $O_2/C$ molar ratio has to be kept from becoming smaller than 0.5. Further, as will be understood from FIG. 4, in a range where no excess carbon is produced, the amount of generation of hydrogen becomes largest when the $O_2/C$ molar ratio is 0.5. Therefore, in the embodiment of the present invention, when the partial oxidation reforming reaction is performed for generating hydrogen, to avoid the occurrence of the coking and enable hydrogen to be generated most efficiently, the $O_2/C$ molar ratio is in principle made 0.5.

On the other hand, even if the $O_2/C$ molar ratio is made larger than the stoichiometric air-fuel ratio of the $O_2/C$ molar ratio=1.4575, the complete oxidation reaction is performed, but the larger the $O_2/C$ molar ratio becomes, the greater the amount of air to be raised in temperature. Therefore, as shown in FIG. 3, if the $O_2/C$ molar ratio is made greater than the $O_2/C$ molar ratio=1.4575 showing the stoichiometric air-fuel ratio, the larger the $O_2/C$ molar ratio becomes, the more the reaction equilibrium temperature TB will fall. In this case, for example, if the $O_2/C$ molar ratio is made a lean air-fuel ratio of 2.6, when the air temperature is 25° C., the reaction equilibrium temperature TB becomes about 920° C.

Figure 5:
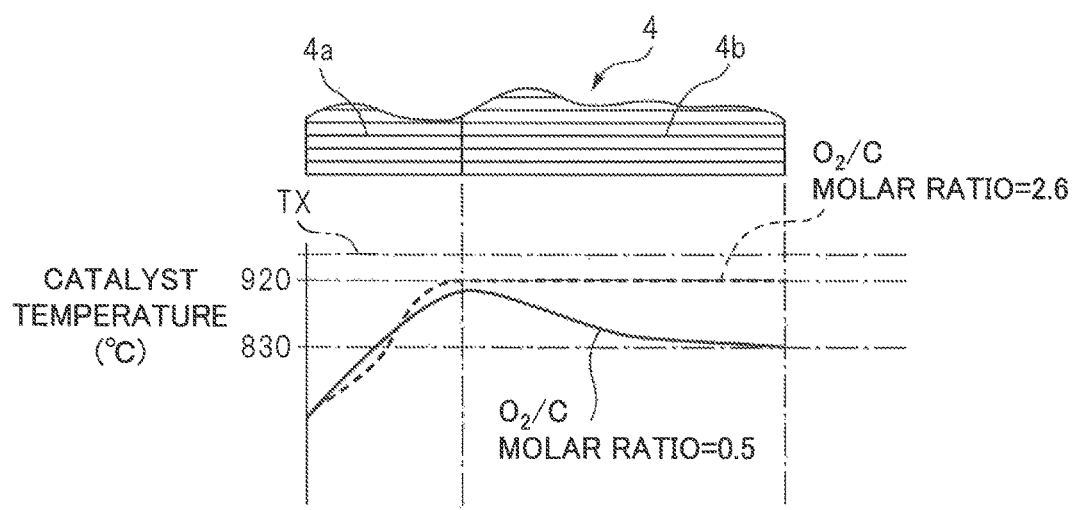
FIG. 5 is a view showing a temperature distribution inside a reformer catalyst.

Now then, as explained above, at the time of start of operation of the heat and hydrogen generation device 1 shown in FIG. 1, the fuel injected from the burner 7 is ignited by the glow plug 19. Due to this, at the inside of the burner combustion chamber 3, the fuel and air injected from the burner 7 react, whereby burner combustion is started. If the burner combustion is started, the temperature of the reformer catalyst 4 gradually rises. At this time, the burner combustion is performed under a lean air-fuel ratio. Next, if the temperature of the reformer catalyst 4 reaches a temperature able to reform the fuel, the air-fuel ratio is switched from a lean air-fuel ratio to a rich air-fuel ratio and a reforming action of fuel at the reformer catalyst 4 is started. If the reforming action of fuel is started, hydrogen is generated. FIG. 5 shows the temperature distribution inside the oxidizing part 4a and reforming part 4b of the reformer catalyst 4 when the reaction at the reformer catalyst 4 becomes an equilibrium state. Note that, this FIG. 5 shows the temperature distribution in the case where the outside air temperature is 25° C. and this outside air is fed through the low temperature air flow passage 14 shown in FIG. 1 from the burner 7 to the inside of the burner combustion chamber 3.

The solid line of FIG. 5 shows the temperature distribution inside the reformer catalyst 4 when the $O_2/C$ molar ratio of the air and fuel fed from the burner 7 is 0.5. As shown in FIG. 5, in this case, at the oxidizing part 4a of the reformer catalyst 4, the temperature of the reformer catalyst 4 rises toward the downstream side due to the heat of oxidation reaction due to the remaining oxygen. About when the combustion gas proceeds from inside the oxidizing part 4a of the reformer catalyst 4 to the inside of the reforming part 4b, the remaining oxygen in the combustion gas is consumed and a fuel reforming action is performed at the reforming part 4b of the reformer catalyst 4. This reforming reaction is an endothermic reaction. Therefore, the temperature inside the reformer catalyst 4 falls as the reforming action proceeds, that is, toward the downstream side of the reformer catalyst 4. The temperature of the downstream side end face of the reformer catalyst 4 at this time is 830° C. and matches the reaction equilibrium temperature TB when the $O_2/C$ molar ratio=0.5 shown in FIG. 3.

On the other hand, FIG. 5 shows by a broken line the temperature distribution inside the reformer catalyst 4 when the $O_2/C$ molar ratio of the air and fuel fed from the burner 7 is a lean air-fuel ratio of 2.6. In this case as well, the temperature inside the reformer catalyst 4 rises toward the downstream side reformer catalyst 4 due to the heat of oxidation reaction of the fuel inside the oxidizing part 4a of the reformer catalyst 4. On the other hand, in this case, no reforming action is performed inside the reforming part 4b of the reformer catalyst 4, so the temperature of the reformer catalyst 4 is maintained constant in the reforming part 4b. The temperature of the downstream side end face of the reformer catalyst 4 at this time is 920° C. and matches the reaction equilibrium temperature TB when the $O_2/C$ molar ratio=2.6 shown in FIG. 3. That is, the reaction equilibrium temperature TB of FIG. 3 shows the temperature of the downstream side end face of the reformer catalyst 4 when the outside air temperature is 25° C. and this outside air is fed through the low temperature air flow passage 14 shown in FIG. 1 from the burner 7 to the inside of the burner combustion chamber 3.

Figure 6:
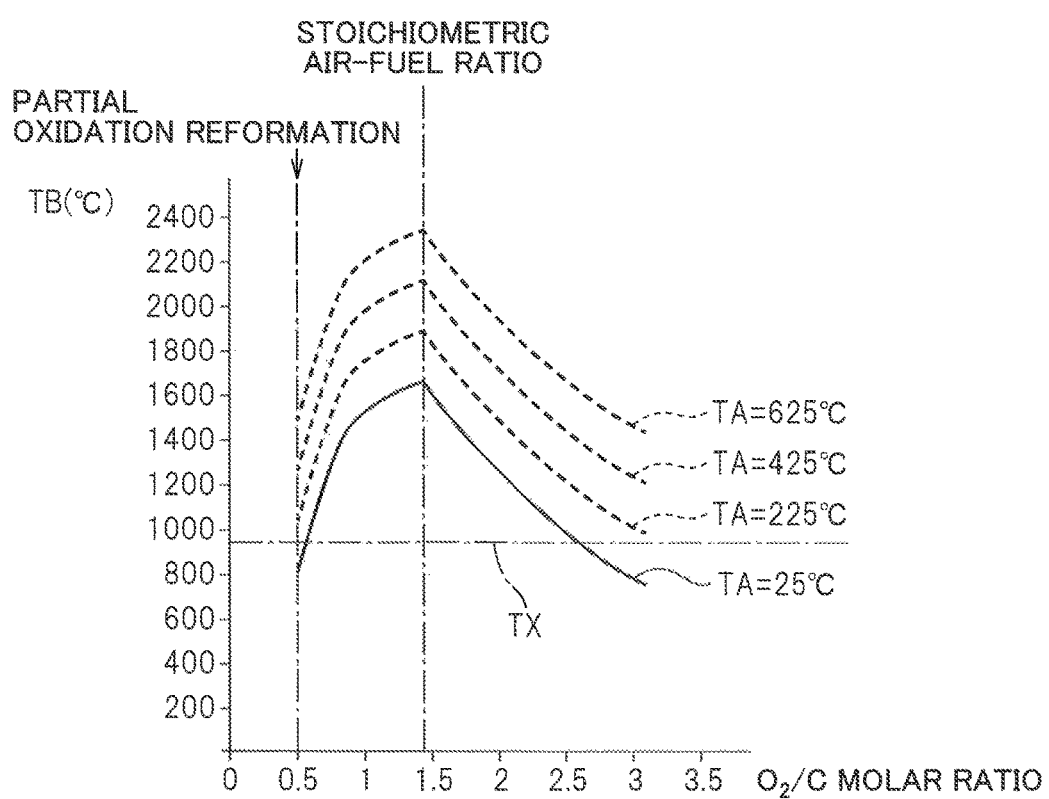
FIG. 6 is a view showing a relationship of at reaction equilibrium temperature TB and an $O_2/C$ molar ratio when the temperature TA of the air fed changes.

Next, referring to FIG. 6, the reaction equilibrium temperature TB when changing the temperature of the air reacted with the fuel at the reformer catalyst will be explained. FIG. 6, in the same way as FIG. 3, shows the relationship between the reaction equilibrium temperature TB when the air and fuel are made to react at the reformer catalyst and reach equilibrium and the $O_2/C$ molar ratio of the air and fuel. Note that, in FIG. 6, TA shows the air temperature. In this FIG. 6, the relationship between the reaction equilibrium temperature TB and the $O_2/C$ molar ratio shown by the solid line in FIG. 3 is shown again by a solid line. FIG. 6 further shows the relationships between the reaction equilibrium temperature TB and the $O_2/C$ molar ratio when changing the air temperature TA to 225° C., 425° C., and 625° C. by broken lines. From FIG. 6, it will be understood that the reaction equilibrium temperature TB becomes higher overall regardless of the $O_2/C$ molar ratio if the air temperature TA rises.

On the other hand, it is confirmed that the reformer catalyst 4 used in the embodiment of the present invention does not greatly deteriorate due to heat if the catalyst temperature is 950° C. or less. Therefore, in the embodiment of the present invention, 950° C. is made the allowable catalyst temperature TX enabling heat degradation of the reformer catalyst 4 to be avoided. This allowable catalyst temperature TX is shown in FIG. 3, FIG. 5, and FIG. 6. As will be understood from FIG. 5, when the air temperature TA is 25° C., both when the $O_2/C$ molar ratio is 0.5 or when the $O_2/C$ molar ratio is 2.6, the temperature of the reformer catalyst 4 when the reaction at the reformer catalyst 4 reaches an equilibrium state becomes the allowable catalyst temperature TX or less at all locations of the reformer catalyst 4. Therefore, in this case, it is possible to continue to use the reformer catalyst 4 without being concerned about heat degradation in practice.

On the other hand, as will be understood from FIG. 3, even when the air temperature TA is 25° C., if the $O_2/C$ molar ratio becomes slightly larger than 0.5, the temperature of the downstream side end face of the reformer catalyst 4 when the reaction at the reformer catalyst 4 reaches the equilibrium state, that is, the reaction equilibrium temperature TB, will end up exceeding the allowable catalyst temperature TX. If the $O_2/C$ molar ratio becomes slightly smaller than 2.6, the temperature of the downstream side end face of the reformer catalyst 4 when the reaction at the reformer catalyst 4 reaches the equilibrium state will end up exceeding the allowable catalyst temperature TX. Therefore, for example, when the reaction at the reformer catalyst 4 is in an equilibrium state, if causing a partial oxidation reforming reaction, the $O_2/C$ molar ratio can be made larger than 0.5, but the range by which the $O_2/C$ molar ratio can be enlarged is limited.

On the other hand, as will be understood, from FIG. 6, if the air temperature TA becomes higher, when the reaction at the reformer catalyst 4 reaches an equilibrium state, even if making the $O_2/C$ molar ratio 0.5, the temperature of the downstream side end face of the reformer catalyst 4 when the reaction at the reformer catalyst 4 reaches an equilibrium state will become higher than the allowable catalyst temperature TX and, therefore, the reformer catalyst 4 will deteriorate due to heat. Therefore, when the air temperature TA becomes high, if the reaction at the reformer catalyst 4 becomes an equilibrium state, the $O_2/C$ molar ratio cannot be made 0.5. Therefore, in the embodiment of the present invention, when the reaction at the reformer catalyst 4 reaches an equilibrium state, the air temperature TA is made a low temperature of about 25° C., and the $O_2/C$ molar ratio is made 0.5 in a state maintaining the air temperature TA at about 25° C.

Next, referring to FIG. 7, the method of generation of heat and hydrogen by the heat and hydrogen generation device 1 shown in FIG. 1 will be explained in brief. Note that, FIG. 7 shows the operating state of the glow plug 19, the amount of air fed from the burner 7, the amount of fuel injected from the burner 7, the $O_2/C$ molar ratio of the air and fuel to be reacted, the temperature of the air fed from the burner 7, and the temperature TC of the downstream side end face of the reformer catalyst 4. Note that, the various target temperatures for the temperature TC of the downstream side end face of the reformer catalyst 4 shown in FIG. 7 etc. and the various target temperatures for the temperature of the reformer catalyst 4 are theoretical values. In the embodiment according to the present invention, as explained above, for example, the actual equilibrium reaction temperature TB becomes somewhat lower than the target temperature of 830° C. These target temperatures change depending on the structure of the heat and hydrogen generation device 1 etc. Therefore, in actuality, it is necessary to perform experiments to set in advance the optimal target temperatures corresponding to the structure of the heat and hydrogen generation device 1.

If the operation of the heat and hydrogen generation device 1 is started, the glow plug 19 is turned on. Next, the air is fed through the high temperature air flow passage 13 to the inside of the burner combustion chamber 3. In this case, as shown by the broken line in FIG. 7, it is also possible to turn the glow plug 19 on after the air is fed through the high temperature air flow passage 13 to the inside of the burner combustion chamber 3. Next, fuel is injected from the burner 7. If the fuel injected from the burner 7 is ignited by the glow plug 19, the amount of fuel is increased, the $O_2/C$ molar ratio of the air and fuel to be reacted is reduced from 4.0 to 3.0, and the burner combustion is started at the inside of the burner combustion chamber 3. In the time period from when the feed of fuel is started to when the fuel is ignited, the air-fuel ratio is made a lean air-fuel ratio so as to suppress as much as possible the amount of generation of HC.

Next, the burner combustion is continued under a lean air-fuel ratio. Due to this, the temperature of the reformer catalyst 4 is made to gradually rise. On the other hand, if the burner combustion is started, the temperature of the gas passing through the reformer catalyst 4 and flowing out into the gas outflow chamber 5 gradually rises. Therefore, the temperature of the air heated at the heat exchange part 13a due to this gas gradually rises. As a result, the temperature of the air fed from the high temperature air flow passage 13 to the inside of the burner combustion chamber 3 gradually rises. Due to this, warm-up of the reformer catalyst 4 is promoted. The warm-up of the reformer catalyst 4 performed under a lean air-fuel ratio in this way in the embodiment of the present invention, as shown in FIG. 7, is called the "primary warm-up". Note that, in the example shown in FIG. 7, during this primary warm-up operation, the amount of feed air and the amount of fuel are increased.

This primary warm-up operation is continued until the reforming of the fuel at the reformer catalyst 4 becomes possible. In the embodiment of the present invention, if the temperature of the downstream side end face of the reformer catalyst 4 becomes 700° C., it is judged that reforming of the fuel has become possible at the reformer catalyst 4. Therefore, as shown in FIG. 7, in the embodiment of the present invention, the primary warm-up operation is continued until the temperature TC of the downstream side end face of the reformer catalyst 4 becomes 700° C. Note that, in the embodiment of the present invention, from the start of operation of the hydrogen generation device 1 to the end of the primary warm-up operation of the reformer catalyst 4, as shown in FIG. 7, the $O_2/C$ molar ratio of the air and fuel to be reacted is made 3.0 to 4.0. Of course, at this time, the temperature of the reformer catalyst 4 is considerably lower than the allowable catalyst temperature TX, so the $O_2/C$ molar ratio of the air and fuel to be reacted can be made an $O_2/C$ molar ratio close to the stoichiometric air-fuel ratio such as 2.0 to 3.0.

Figure 8A:
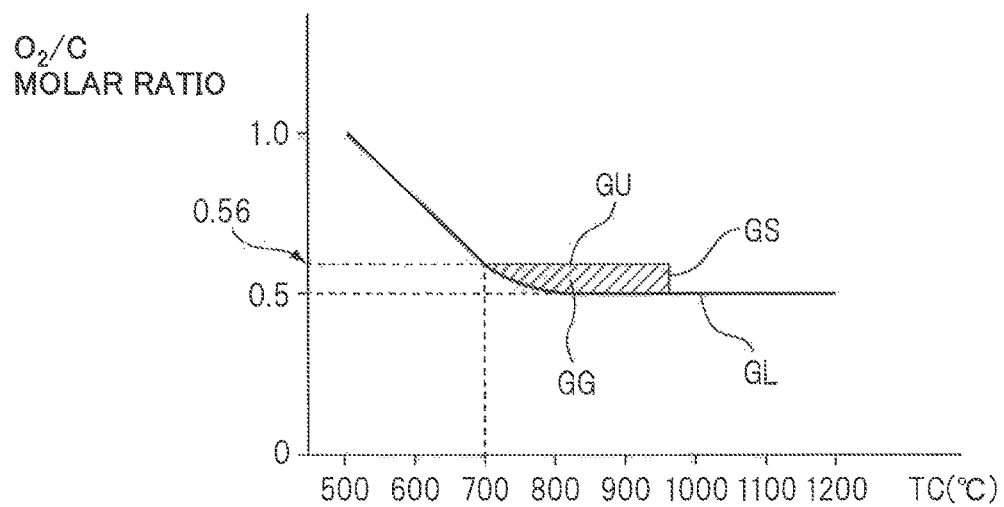
FIGS. 8A and 8B are views showing operating regions performing secondary warm-up operation.

Next, if the temperature TC of the downstream side end face of the reformer catalyst 4 becomes 700° C., it is judged that reforming of the fuel becomes possible at the reformer catalyst 4, and the partial oxidation reforming reaction for generating hydrogen is started. In the embodiment of the present invention, at this time, as shown in FIG. 7, first, a secondary warm-up operation is performed, and when the secondary warm-up operation ends, a normal operation is performed. This secondary warm-up operation is performed to further raise the temperature of the reformer catalyst 4 while generating hydrogen. This secondary warm-up operation is continued until the temperature TC of the downstream side end face of the reformer catalyst 4 reaches the reaction equilibrium temperature TB, and when the temperature TC of the downstream side end face of the reformer catalyst 4 reaches the reaction equilibrium temperature TB, the operation is shifted to the normal operation. In FIG. 8A, the operating region GG of the heat and hydrogen generation device 1 where this secondary warm-up operation is performed is shown by the hatched region surrounded by the solid lines GL, GU, and GS. Note that, in FIG. 8A, the ordinate shows the $O_2/O$ molar ratio of the air and fuel to be reacted while the abscissa shows the temperature TC of the downstream side end face of the reformer catalyst 4.

As explained with reference to FIG. 4, if the $O_2/C$ molar ratio of the air and fuel to be reacted becomes smaller than 0.5, the coking occurs. The solid line GL in FIG. 8A shows the boundary of the $O_2/C$ molar ratio with respect to occurrence of the coking, and the coking occurs in the region of the $O_2/C$ molar ratio smaller than this boundary GL. Note that, if the temperature of the reformer catalyst 4 becomes lower, even if the $O_2/C$ molar ratio becomes larger, that is, even if the degree of richness of the air-fuel ratio falls, carbon C deposits inside the pores of the substrate of the reformer catalyst without being oxidized and the coking occurs. Therefore, as shown in FIG. 8A, the boundary GL of the $O_2/C$ molar ratio where the coking occurs becomes higher the lower the temperature of the reformer catalyst 4. Therefore, to avoid the occurrence of the coking, the partial oxidation reforming reaction, that is, the secondary warm-up operation and the normal operation of the heat and hydrogen generation device 1 are performed on the boundary GL of this $O_2/C$ molar ratio or at the upper side of the boundary GL.

On the other hand, in FIG. 8A, the solid line GU shows the upper limit guard value of the $O_2/C$ molar ratio for preventing the temperature of the reformer catalyst 4 from exceeding the allowable catalyst temperature TX at the time of the secondary warm-up operation of the heat and hydrogen generation device 1, while the solid line GS shows the upper limit guard value of the temperature TC of the downstream side end face of the reformer catalyst 4 for preventing the temperature of the reformer catalyst 4 from exceeding the allowable catalyst temperature TX at the time of the secondary warm-up operation of the heat and hydrogen generation device 1. After the secondary warm-up operation is started, the $O_2/C$ molar ratio is made 0.5. If the temperature TC of the downstream side end face of the reformer catalyst 4 reaches the reaction equilibrium temperature TB in the $O_2/C$ molar ratio=0.5, the operation is shifted to the normal operation and hydrogen continues to be generated in the state with the temperature TC of the downstream side end face of the reformer catalyst 4 held at the reaction equilibrium temperature TB.

Figure 8B:
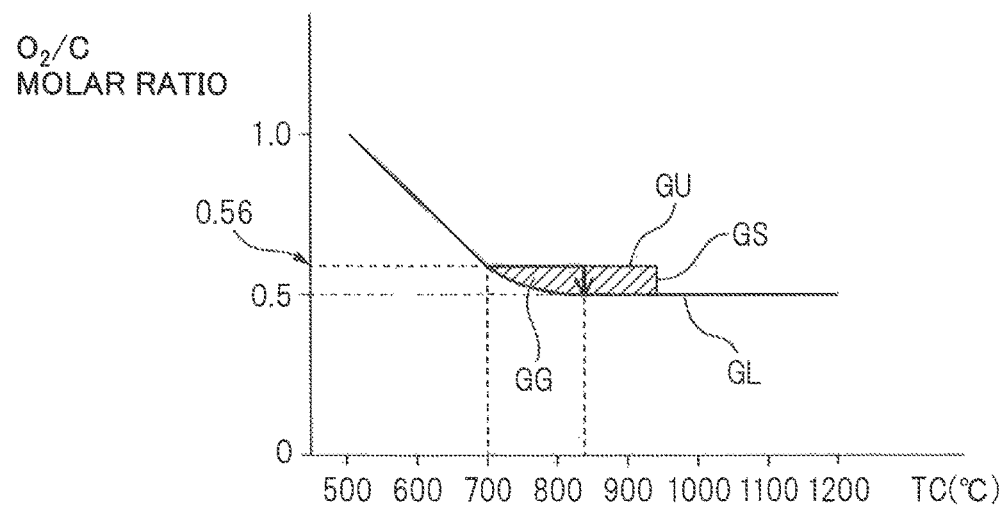

FIG. 8B shows one example of a secondary warm-up control until shifting to the normal operation. In the example shown in FIG. 8B, as shown by the arrows, if the temperature of the downstream side end face of the reformer catalyst 4 becomes 700° C., to promote the secondary warm-up of the reformer catalyst 4, the partial oxidation reforming reaction is started by the $O_2/C$ molar ratio=0.56. Next, until the temperature TC of the downstream side end face of the reformer catalyst 4 becomes 830° C., the partial oxidation reforming reaction is continued by the $O_2/C$ molar ratio=0.56. Next, if the temperature of the downstream side end face of the reformer catalyst 4 becomes 830° C., the $O_2/C$ molar ratio is reduced until the $O_2/C$ molar ratio=0.5. Next, if the $O_2/C$ molar ratio becomes 0.5, the reforming reaction at the reformer catalyst 4 becomes an equilibrium state. Next, the $O_2/C$ molar ratio is maintained at 0.5 and the operation is shifted to the normal operation.

Now, when in this way the reforming reaction at the reformer catalyst 4 becomes an equilibrium state, if the temperature TA of the air made to react with the fuel is high, as explained referring to FIG. 6, the reaction equilibrium temperature TB becomes higher. As a result, the temperature of the reformer catalyst 4 becomes higher than even the allowable catalyst temperature TX, so the reformer catalyst 4 degrades due to heat. Therefore, in the embodiment of the present invention, when the $O_2/C$ molar ratio is maintained at 0.5 and the reforming reaction at the reformer catalyst 4 becomes an equilibrium state, the feed of high temperature air from the high temperature air flow passage 13 to the inside of the burner combustion chamber 3 is stopped and low temperature air is fed from the low temperature air flow passage 14 to the inside of the burner combustion chamber 3. At this time, the temperature TC of the downstream side end face of the reformer catalyst 4 is maintained at 830° C., therefore, the temperature of the reformer catalyst 4 is maintained at the allowable catalyst temperature TX or less. Therefore, it is possible to avoid degradation of the reformer catalyst 4 due to heat while generating hydrogen by the partial oxidation reforming reaction.

Note that, when the secondary warm-up operation is being performed in the operating region GG shown in FIGS. 8A and 8B, since the reforming reaction at the reformer catalyst 4 does not become an equilibrium state, even if the air temperature TA is high, the temperature of the reformer catalyst 4 will not rise as shown in FIG. 6. However, this secondary warm-up operation is performed in the state where the temperature of the reformer catalyst 4 is high, so there is the danger that for some reason or another, the temperature of the reformer catalyst 4 will end up becoming higher than the allowable catalyst temperature TX. Therefore, in the embodiment of the present invention, to prevent the temperature of the reformer catalyst 4 from becoming higher than the allowable catalyst temperature TX, at the same time as the secondary warm-up is started, the feed of high pressure air from the high temperature air flow passage 13 to the inside of the burner combustion chamber 3 is stopped and low temperature air is fed from the low temperature air flow passage 14 to the inside of the burner combustion chamber 3. That is, as shown in FIG. 7, the feed air temperature is made to fall. After that, low temperature air continues to be fed from the low temperature air flow passage 14 to the inside of the burner combustion chamber 3 until the normal operation is completed.

As explained above, when the temperature TA of the air made to react with the fuel is 25° C., the equilibrium reaction temperature TB when $O_2/C$ molar ratio=0.5 becomes 830° C. Therefore, generally speaking, when the temperature of the air made to react with the fuel is TA° C., the equilibrium reaction temperature TB when $O_2/C$ molar ratio=0.5 becomes (TA+805° C.). Therefore, in the embodiment of the present invention, when the temperature of the air made to react with the fuel is TA, when the secondary warm-up operation is started, the partial oxidation reforming reaction is continued by the $O_2/C$ molar ratio=0.56 until the temperature TC of the downstream side end face of the reformer catalyst 4 becomes (TA+805° C.). Next, when the temperature TC of the downstream side end face of the reformer catalyst 4 becomes (TA+805° C.), the $O_2/C$ molar ratio is made to decrease until the $O_2/C$ molar ratio=0.5. Next, if the $O_2/C$ molar ratio becomes 0.5, the $O_2/C$ molar ratio is maintained at 0.5.

Note that, the above mentioned temperature TA of the air made to react with the fuel is the temperature of the air used when calculating the equilibrium reaction temperature TB such as shown in FIG. 3 and the temperature of air not affected by the heat of reaction of burner combustion at the inside of the burner combustion chamber 3. For example, the air fed from the air feed port 11 or the air inside the air chamber 10 is affected by the heat of reaction of the burner combustion and rises in temperature by absorbing the energy of the heat of reaction of the burner combustion. Therefore, the temperature of these air shows the temperature of the air already in the process of reaction, but is not the temperature of the air when calculating the equilibrium reaction temperature TB.

In this regard, the equilibrium reaction temperature TB has to be calculated when the partial oxidation reforming reaction is being performed, that is, when low temperature air is being fed from the low temperature air flow passage 14 to the inside of the burner combustion chamber 3. Therefore, in the embodiment of the present invention, to detect the temperature of the air not affected by the heat of reaction of burner combustion at the inside of the burner combustion chamber 3, the temperature sensor 24 is arranged in the low temperature air flow passage 14 positioned at the outside of the heat insulating material 6 as shown in FIG. 1. The temperature detected by this temperature sensor 24 is used as the temperature TA of the air when calculating the equilibrium reaction temperature TB.

On the other hand, if a stop instruction is issued, the feed of fuel is stopped as shown in FIG. 7. If the feed of air is stopped at this time, the fuel remaining inside the heat and hydrogen generation device 1 is liable to cause the coking of the reformer catalyst 4. Therefore, in the embodiment of the present invention, to burn off the fuel remaining in the heat and hydrogen generation device 1, air continues to be fed for a while after the stop instruction is issued as shown in FIG. 7.

In this way, in the embodiment of the present invention, to prevent the temperature of the reformer catalyst 4 from becoming higher than the allowable catalyst temperature TX, at the same time as starting the secondary warm-up operation, the feed of high temperature air from the high temperature air flow passage 13 to the inside of the burner combustion chamber 3 is stopped and low temperature air is fed from the low temperature air flow passage 14 to the inside of the burner combustion chamber 3. In other words, at this time, the air flow route for feeding air into the burner combustion chamber 3 is switched from the high temperature air flow route for feeding high temperature air to the low temperature air flow route for feeding low temperature air. To enable the air flow route for feeding air into the burner combustion chamber 3 to be switched between the high temperature air flow route and the low temperature air flow route in this way, in the embodiment of the present invention, a switching device comprised of a high temperature air valve 16 and a low temperature air valve 17 is provided. In this case, in the embodiment of the present invention, the air flow route from the air cleaner 18 through the high temperature air flow passage 13 to the air feed port 11 corresponds to the high temperature air flow route, while the air flow route from the air cleaner 18 through the low temperature air flow passage 14 to the air feed port 11 corresponds to the low temperature air flow route.

Figure 10:
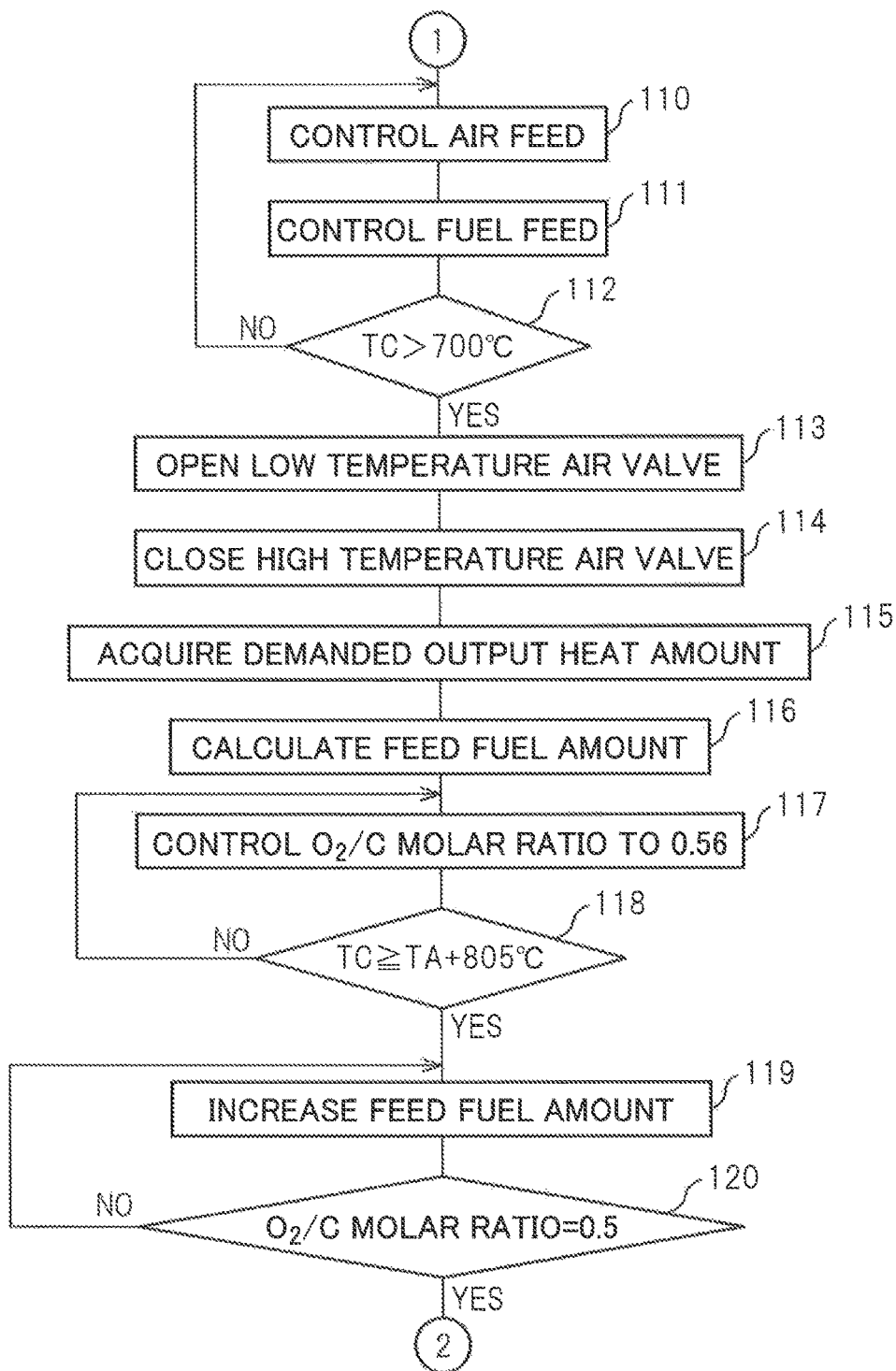
FIG. 10 is a flow chart for heat and hydrogen generation control.
Figure 11:
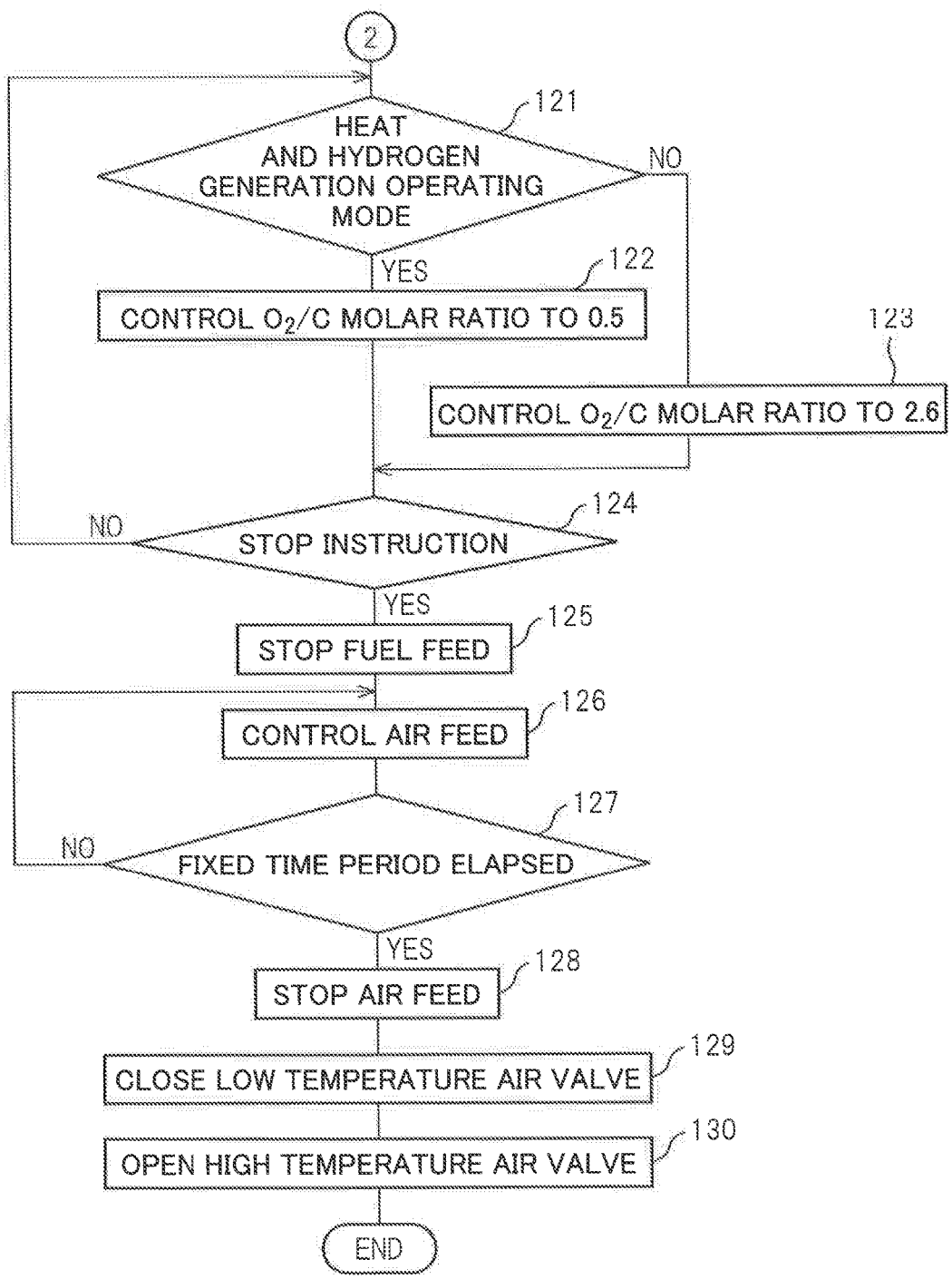
FIG. 11 is a flow chart for heat and hydrogen generation control.

Next, the control routine for heat and hydrogen generation shown in FIG. 9 to FIG. 11 will be explained. This heat and hydrogen generation control routine is performed when a heat and hydrogen generation control start instruction is issued at the instruction generating part 39 shown in FIG. 1. In this case, for example, this heat and hydrogen generation control start instruction is issued when a start switch of the heat and hydrogen generation device 1 is turned on. Further, when the heat and hydrogen generation device 1 is used for warming up an exhaust purification catalyst of a vehicle, this heat and hydrogen generation control start instruction is issued when the ignition switch is turned on.

Figure 9:
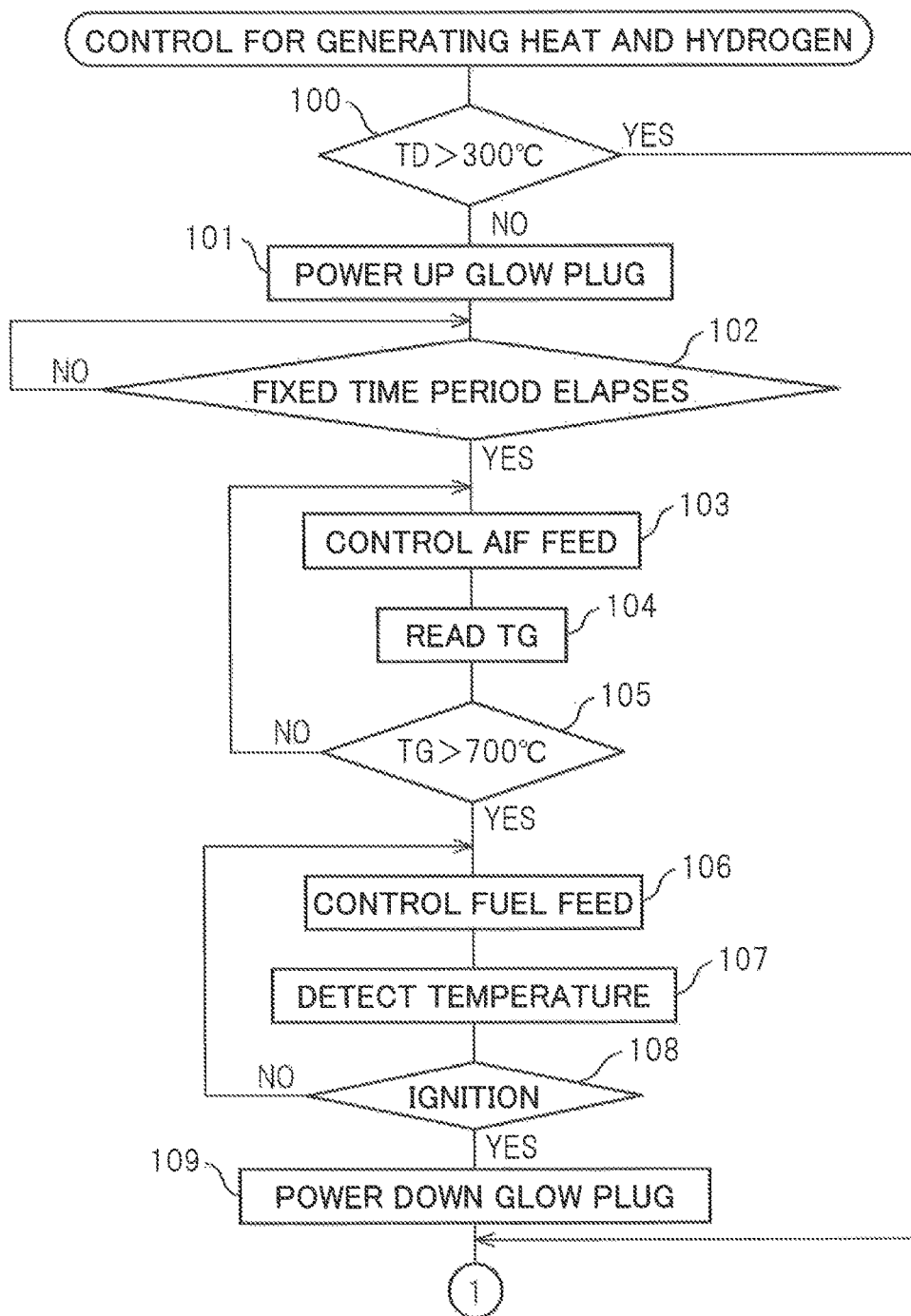
FIG. 9 is a flow chart for heat and hydrogen generation control.

If the control routine for heat and hydrogen generation is performed, first, at step 100 of FIG. 9, it is judged based on the output signal of the temperature sensor 22 if the temperature TD of the upstream side end face of the reformer catalyst 4 is a temperature at which an oxidation reaction can be performed on the upstream side end face of the reformer catalyst 4, for example, 300° C. or more. If the temperature ID of the upstream side end face of the reformer catalyst 4 is 300° C. or less, the routine proceeds to step 101 where the glow plug 19 is turned on. Next, at step 102, it is judged if a fixed time period has elapsed from when the glow plug 19 is turned on. When the fixed time period has elapsed, the routine proceeds to step 103.

At step 103, the air pump 15 is operated and air is fed to the burner combustion chamber 3 through the high temperature air flow passage 13. Note that, when the operation of the heat and hydrogen generation device 1 is stopped, the high temperature air valve 16 is opened and the low temperature air valve 17 is closed. Therefore, when the heat and hydrogen generation device 1 is made to operate, air is fed to the burner combustion chamber 3 through the high temperature air flow passage 13. Next, at step 104, the temperature TG of the glow plug 19 is calculated from the resistance value of the glow plug 19. Next, at step 105, it is judged if the temperature TG of the glow plug 19 exceeds 700° C. When it is judged that the temperature of the glow plug 19 does not exceed 700° C., the routine returns to step 103. As opposed to this, when it is judged that the temperature TG of the glow plug 19 exceeds 700° C., it is judged that ignition is possible and the routine proceeds to step 106.

At step 106, fuel is injected from the burner 7 to the burner combustion chamber 3. Next, at step 107, the temperature TD of the upstream side end face of the reformer catalyst 4 is detected based on the output signal of the temperature sensor 22. Next, at step 108, it is judged from the output signal of the temperature sensor 22 if the fuel is ignited. If the fuel is ignited, the temperature TO of the upstream side end face of the reformer catalyst 4 instantaneously rises. Therefore, it is possible to judge if the fuel is ignited from the output signal of the temperature sensor 22. When at step 108 it is judged that the fuel is not ignited, the routine returns to step 106, while when at step 108 it is judged that the fuel is ignited, the routine proceeds to step 109 where the glow plug 19 is turned off. Next, the routine proceeds to step 110 of FIG. 10. Note that, if the fuel is ignited, the temperature TD of the upstream side end face of the reformer catalyst 4 immediately becomes a temperature at which an oxidation reaction can be performed at the upstream side end face of the reformer catalyst 4, for example, 300° C. or more. On the other hand, even when at step 100 it is judged that the temperature TD of the upstream side end face of the reformer catalyst 4 is 300° C. or more, the routine proceeds to step 110.

At step 110 and step 111, the primary warm-up operation is performed. That is, the discharge rate of the air pump 15 is controlled at step 110 and the fuel injection amount from the burner 7 is controlled at step 111 so that the $O_2/C$ molar ratio becomes 3.0. Note that, in the embodiment of the present invention, when this primary warm-up operation is performed, the air feed amount and fuel injection amount are increased in stages as shown in FIG. 7. Next, at step 112, it is judged based on the output signal of the temperature sensor 23 if the temperature TC of the downstream side end face of the reformer catalyst 4 exceeds 700° C. When it is judged that the temperature TC of the downstream side end face of the reformer catalyst 4 does not exceed 700° C., the routine returns to step 110 where the primary warm-up operation continues to be performed. As opposed to this, when it is judged that the temperature TC of the downstream side end face of the reformer catalyst 4 exceeds 700° C., the routine proceeds to step 113 where the partial oxidation reforming reaction is started. That is, the secondary warm-up operation is started.

If the partial oxidation reforming reaction is started, that is, if the secondary warm-up operation Is started, at step 113, the low temperature air valve 17 is opened and the high temperature air valve 16 is closed. Therefore, at this time, air is fed through the low temperature air flow passage 14 to the burner combustion chamber 3. Next, at step 115, the demanded value of the output heat amount (kW) is acquired. For example, when the heat and hydrogen generation device 1 is used for warming up an exhaust purification catalyst of a vehicle, the demanded value of this output heat amount is made the amount of heat required for raising the exhaust purification catalyst to the activation temperature. Next, at step 116, the fuel injection amount required for generating the demanded value of the output heat amount (kW) is calculated.

Next, at step 117, fuel is injected by the injection amount calculated at step 116 and the discharge rate of the air pump 15 is controlled so that the $O_2/C$ molar ratio becomes 0.56. At this time, the partial oxidation reforming reaction is performed and hydrogen is generated. Next, at step 118, it is judged if the temperature TC of the downstream side end face of the reformer catalyst 4 reaches the sum (TA+805° C.) of the air temperature TA detected by the temperature sensor 24 and 805° C. As explained above, this temperature (TA+805° C.) shows the reaction equilibrium temperature TB when the air temperature is TA° C. and the partial oxidation reforming reaction is performed by the $O_2/C$ molar ratio=0.5. Therefore, at step 118, it is judged if the temperature TC of the downstream side end face of the reformer catalyst 4 reaches the reaction equilibrium temperature (TA+805° C.).

When it is judged that the temperature TC of the downstream side end face of the reformer catalyst 4 does not reach the reaction equilibrium temperature (TA+805° C.), the routine returns to step 117 where the discharge rate of the air pump 15 continues to be controlled so that the $O_2/C$ molar ratio becomes 0.56. As opposed to this, when at step 118 it is judged that the temperature TC of the downstream side end face of the reformer catalyst 4 reaches the reaction equilibrium temperature (TA+805° C.), the routine proceeds to step 119 where the discharge rate of the air pump 15 is maintained constant and the fuel injection amount is gradually increased. As a result, the $O_2/C$ molar ratio is gradually decreased. Next, at step 120, it is judged if the $O_2/C$ molar ratio becomes 0.5. When it is judged that the $O_2/C$ molar ratio does not become 0.5, the routine returns to step 119. As opposed to this, when at step 120 it is judged that the $O_2/C$ molar ratio becomes 0.5, it is judged that the secondary warm-up has been completed. When it is judged that the secondary warm-up has been completed, the routine proceeds to step 121 of FIG. 11 where the normal operation is performed.

In the embodiment of the present invention, as the operating modes at the time of the normal operation, a heat and hydrogen generating operating mode and a heat generating operating mode, that is, two operating modes, can be selected. The neat and hydrogen generating operating mode is an operating mode performing the partial oxidation reforming reaction by the $O_2/C$ molar ratio=0.5. In this heat and hydrogen generating operating mode, heat and hydrogen are generated. On the other hand, the heat generating operating mode is an operating mode performing the complete oxidation reaction by for example the $O_2/C$ molar ratio=2.6. In this heat generating operating mode, hydrogen is not generated. Only heat is generated. These heat and hydrogen generating operating mode and heat generating operating mode are used selectively according to need.

Now, returning again to FIG. 11, at step 121, it is judged if the mode is the heat and hydrogen generating operating mode. When at step 121 it is judged the mode is the heat and hydrogen generating operating mode, the routine proceeds to step 122 wherein the partial oxidation reforming reaction is performed by the $O_2/C$ molar ratio=0.5. At this time, heat and hydrogen are generated. Next, the routine proceeds to step 124. On the other hand, when at step 121 it is judged that the mode is not the heat and hydrogen generating operating mode, that is, when it is judged the mode is the heat generating operating mode, the routine proceeds to step 123 where the complete oxidation reaction is performed by the $O_2/C$ molar ratio=2.6. At this time, only heat is generated. Next, the routine proceeds to step 124.

At step 124, it is judged if an instruction for stopping operation of the heat and hydrogen generation device 1 is issued. The instruction for stopping operation of the heat and hydrogen generation device 1 is issued at the instruction generating part 33 shown in FIG. 1. When the instruction for stopping operation of the heat and hydrogen generation device 1 is not issued, the routine returns to step 121. As opposed to this, when at step 124 it is judged that the instruction for stopping operation of the heat and hydrogen generation device 1 is issued, the routine proceeds to step 125 where the injection of fuel from the burner 7 is stopped. Next, at step 126, to replace the remaining fuel with air, a small amount of air is fed from the air pump 15. Next, at step 127, it is judged if a fixed time period has elapsed. When it is judged that the fixed time period has not elapsed, the routine returns to step 126.

As opposed to this, when at step 127 it is judged that the fixed time period has elapsed, the routine proceeds to step 128 where the operation of the air pump 15 is stopped and the feed of air to the inside of the burner combustion chamber 3 is stopped. Next, at step 129, the low temperature air valve 17 is closed and the high temperature air valve 16 is opened. Next, while the operation of the heat and hydrogen generation device 1 is stopped, the low temperature air valve 17 continues closed and the high temperature air valve 16 continues open.

Figure 12:
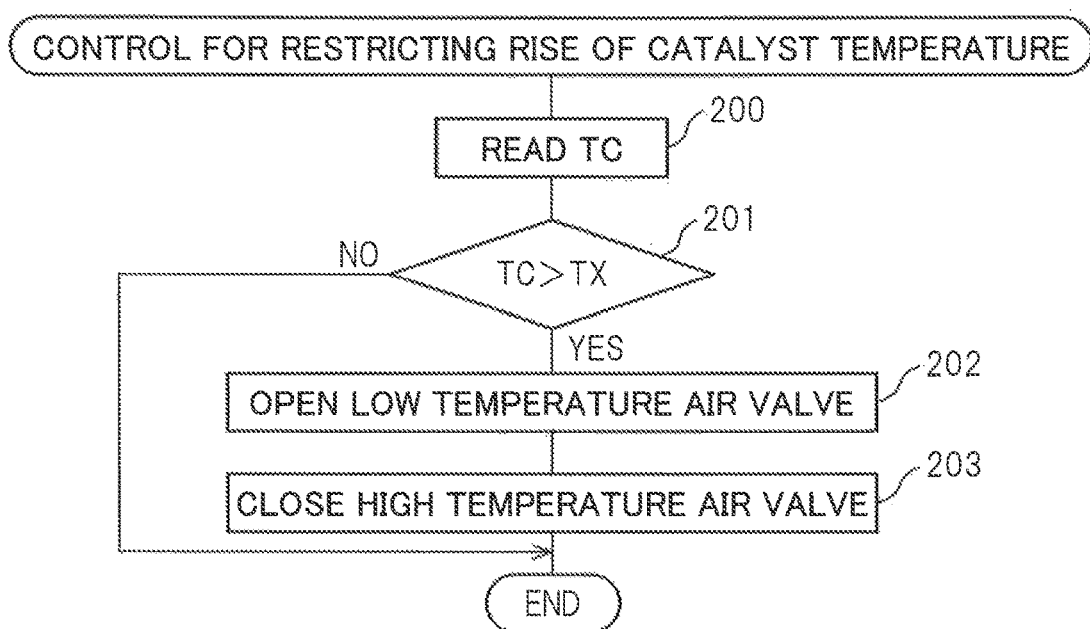
FIG. 12 is a flow chart for control for restricting the rise of catalyst temperature.

Next, referring to FIG. 12, a control routine for restricting the rise of the catalyst temperature will be explained. This routine is executed by interruption every fixed time interval. Referring to FIG. 12, first, at step 200, the temperature TC of the downstream side end face of the reformer catalyst 4 detected by the temperature sensor 23 is read in. Next, at step 201, it is judged if the temperature TC of the downstream side end face of the reformer catalyst 4 exceeds the allowable catalyst temperature TX. When it is judged that the temperature TC of the downstream side end face of the reformer catalyst 4 does not exceed the allowable catalyst temperature TX, the processing cycle is ended.

As opposed to this, when, at step 201, it is judged that the temperature TC of the downstream side end face of the reformer catalyst 4 exceeds the allowable catalyst temperature TX, the routine proceeds to step 202 where the low temperature air valve 17 is opened. Next, at step 203, the high temperature air valve 16 is closed. Next, the processing cycle is ended. That is, during operation of the heat and hydrogen generation device 1, when the temperature TC of the downstream side end face of the reformer catalyst 4 exceeds the allowable catalyst temperature TX, the air flow route for feeding air into the burner combustion chamber 3 is switched from the high temperature air flow route for feeding high temperature air to the low temperature air flow route for feeding low temperature air, and the temperature of the burner combustion use air fed into the burner combustion chamber 3 is lowered.

Now, as explained above, at the time of the primary warm-up operation, the fuel fed from the burner 7 to the inside of the burner combustion chamber 3 and the air fed from the burner 7 to the inside of the burner combustion chamber 3 are made to burn by the burner under a lean air-fuel ratio. Next, if shifting from the primary warm-up operation to the secondary warm-up operation, immediately the feed of high temperature air from the high temperature air flow passage 13 to the burner combustion chamber 3 is stopped and low temperature air is fed from the low temperature air flow passage 14 to the burner combustion chamber 3. In other words, if shifting from the primary warm-up operation to the secondary warm-up operation, immediately, the air flow route for feeding air from the burner 7 into the burner combustion chamber 3 is switched from the high temperature air flow route for feeding high temperature air to the low temperature air flow route for feeding low temperature air.

That is, when shifting from the primary warm-up operation to the secondary warm-up operation, if continuing to feed high temperature air from the high temperature air flow passage 13 to the inside of the burner combustion chamber 3, it is predicted that sooner or later the temperature of the reformer catalyst 4 will exceed the allowable catalyst temperature TX. Therefore, in the embodiment of the present invention, as shown in FIG. 7, when shifting from the primary warm-up operation to the secondary warm-up operation, that is, when it is predicted that the temperature of the reformer catalyst 4 will exceed the allowable catalyst temperature TX, the air flow route for feeding air into the burner combustion chamber 3 is switched from the high temperature air flow route for feeding high temperature air to the low temperature air flow route for feeding low temperature air, and the temperature of the burner combustion use air fed into the burner combustion chamber 3 is made to fall.

On the other hand, in the embodiment of the present invention, as performed in the control routine for restricting the rise of the catalyst temperature shown in FIG. 12, when the temperature TC of the downstream side end face of the reformer catalyst 4 actually exceeds the allowable catalyst temperature TX during the operation of the heat and hydrogen generation device 1, the air flow route for feeding air from the burner 7 into the burner combustion chamber 3 is switched from the high temperature air flow route for feeding high temperature air to the low temperature air flow route for feeding low temperature air, and the temperature of the air fed from the burner 7 to the inside of the burner combustion chamber 3 is made to fall. Therefore, the temperature of the reformer catalyst 4 is kept from excessively rising and therefore the reformer catalyst 4 is kept from degrading due to the heat.

That is, in the present invention, there is provided a heat and hydrogen generation device 1 comprising a burner combustion chamber 3, a burner 7 arranged in the burner combustion chamber 3 for performing burner combustion, a fuel feed device able to control an amount of feed of fuel fed from the burner 7 into the burner combustion chamber 3, an air feed device able to control the temperature and amount of feed of air fed from the burner 7 into the burner combustion chamber 3, an ignition device 19 for causing the fuel to ignite, a reformer catalyst 4 to which burner combustion gas is fed, and an electronic control unit 30. The air feed device is provided with a heat exchange part 13a for heating the air fed from the burner 7 into the burner combustion chamber 3 by the burner combustion gas, and heat and hydrogen are generated by performing the burner combustion. An allowable catalyst temperature TX enabling heat degradation of the reformer catalyst 4 to be avoided is set in advance, and the electronic control unit 30 controls the air feed device to lower the temperature of the air fed from the burner 7 into the burner combustion chamber 3 for maintaining the temperature of the reformer catalyst 4 at below the allowable catalyst temperature TX when the burner combustion is being performed and when the temperature of the reformer catalyst 4 exceeds the allowable catalyst temperature TX or it is predicted that the temperature of the reformer catalyst 4 will exceed the allowable catalyst temperature TX.

In this case, in the embodiment of the present invention, the electronic control unit 30 lowers the temperature of the air fed from the burner 7 into the burner combustion chamber 3 by stopping the feed of air heated at the heat exchange part 13a into the burner combustion chamber 3 and feeding air of a lower temperature than the air heated at the heat exchange part 13a from the burner 7 into the burner combustion chamber 3. Explained in a bit more detail, in the embodiment of the present invention, a switching device for switching an air flow route for feeding air from the burner 7 into the burner combustion chamber 3 between a high temperature air flow route for feeding air heated at the heat exchange part 13a and a low temperature air flow route for feeding air lower in temperature than the air heated at the heat exchange part 13a is provided. The electronic control unit 30 switches the air flow route for feeding air from the burner 7 into the burner combustion chamber 3 from the high temperature air flow route to the low temperature air flow route when lowering the temperature of the air fed from the burner 7 into the burner combustion chamber 3.

In this regard, to suppress heat degradation of the reformer catalyst 4, it is sufficient to provide just the low temperature air flow route so as to feed low temperature air from the burner 7 into the burner combustion chamber 3. However, when warming up the reformer catalyst 4 by the primary warm-up operation, to promote warm-up of the reformer catalyst 4, it is preferable to feed high temperature air from the burner 7 into the burner combustion chamber 3. Therefore, in the embodiment of the present invention, the high temperature air flow route is provided to feed air heated at the heat exchange part 13a from the burner 7 into the burner combustion chamber 3.

On the other hand, in the embodiment of the present invention, when the heat and hydrogen generation device 1 starts to be operated, the electronic control unit 30 performs a primary warm-up operation in which the temperature of the reformer catalyst 4 is made to rise by performing burner combustion by a lean air-fuel ratio, and then performs a secondary warm-up operation in which the temperature of the reformer catalyst 4 is made to rise and hydrogen is generated at the reformer catalyst 4 by performing burner combustion by a rich air-fuel ratio. Note that, in this case, the electronic control unit 30 predicts that the temperature of the reformer catalyst 4 will exceed the allowable catalyst temperature TX when the primary warm-up operation is switched to the secondary warm-up operation and thereby lowers the temperature of the burner combustion use air fed from the burner 7 into the burner combustion chamber 3.

Further, in the embodiment of the present invention, at the time of the primary warm-up operation, the $O_2/C$ molar ratio of the air and fuel to be reacted is made from 2.0 to 4.0, while at the time of the secondary warm-up operation, the $O_2/C$ molar ratio of the air and fuel which are made to react is made from 0.5 to 0.56. Further, in the embodiment of the present invention, the electronic control unit 30 switches to the secondary warm-up operation if the temperature of the reformer catalyst exceeds a predetermined temperature, for example, 700° C., when the primary warm-up operation is being performed.

On the other hand, at the time of the primary warm-up operation, if the temperature of the air flowing out from the heat exchange part 13a becomes higher, there is the danger that the temperature of the reformer catalyst 4 will exceed the allowable catalyst temperature TX. Therefore, the heat and hydrogen generation device can be configured so that if the temperature of the air flowing out from the heat exchange part 13a exceeds a predetermined temperature when the primary warm-up operation is being performed, the primary warm-up operation is switched to the secondary warm-up operation. In this case, a temperature sensor for detecting the temperature of the air flowing out from the heat exchange part 13a is provided at the air outflow port from the heat exchange part 13a, and the electronic control unit 30 judges if the temperature of the air detected by this temperature sensor exceeds a predetermined temperature, and switches from the primary warm-up operation to the secondary warm-up operation when it is judged that the temperature of the air detected by this temperature sensor exceeds the predetermined temperature.

On the other hand, when the heat and hydrogen generation device 1 is being normally operated, sometimes it is demanded that the heat and hydrogen generation device 1 generate only heat and sometimes it is demanded that the heat and hydrogen generation device 1 generate heat and hydrogen. Therefore, in the embodiment of the present invention, as shown at steps 121 to 123 of FIG. 11, the electronic control unit 30 is used to switch the operating mode of the heat and hydrogen generation device 1 to either a heat generating operating mode generating heat by performing the complete oxidation reaction by a lean air-fuel ratio and a heat and hydrogen generating operating mode generating heat and hydrogen by performing the partial oxidation reforming reaction by a rich air-fuel ratio.

REFERENCE SIGNS LIST 1. heat, and hydrogen generation device
3. burner combustion chamber
4. reformer catalyst
5. gas outflow chamber
7. burner
9. fuel injection port
11. air feed port
13. high temperature air flow passage
13a. heat exchange part
14. low temperature air flow passage
15. air pump
16. high temperature air valve
17. low temperature air valve
19. glow plug
22, 23, 24. temperature sensor

The invention claimed is:

1. A heat and hydrogen generation device comprising:
a burner combustion chamber;
a burner arranged in the burner combustion chamber for performing burner combustion;
a fuel feed device able to control an amount of feed of fuel fed from the burner into the burner combustion chamber;
an air feed device able to control a temperature and amount of feed of air fed from the burner into the burner combustion chamber;
an ignition device for causing the fuel to ignite, a reformer catalyst to which burner combustion gas is fed; and
an electronic control unit,
wherein said air feed device is provided with a heat exchange part for heating the air fed from the burner into the burner combustion chamber by the burner combustion gas, heat and hydrogen being generated by performing the burner combustion, wherein an allowable catalyst temperature enabling heat degradation of said reformer catalyst to be avoided is set in advance,
said electronic control unit is programmed to control said air feed device to lower the temperature of the air fed from said burner into the burner combustion chamber for maintaining the temperature of the reformer catalyst at below the allowable catalyst temperature when the burner combustion is being performed and when the temperature of said reformer catalyst exceeds said allowable catalyst temperature or it is predicted that the temperature of said reformer catalyst will exceed said allowable catalyst temperature, and
when the heat and hydrogen generation device starts to be operated, said electronic control unit is programmed to perform a primary warm-up operation in which the temperature of the reformer catalyst is made to rise by performing burner combustion by a lean air-fuel ratio, and then perform a secondary warm-up operation in which the temperature of the reformer catalyst is made to rise and hydrogen is generated at the reformer catalyst by performing burner combustion by a rich air-fuel ratio.

2. The heat and hydrogen generation device as claimed in claim 1, wherein said electronic control unit is programmed to lower the temperature of the air fed from said burner into the burner combustion chamber by stopping the feed of air heated at said heat exchange part into the burner combustion chamber and feeding air of a lower temperature than the air heated at said heat exchange part from said burner into said burner combustion chamber.

3. The heat and hydrogen generation device as claimed in claim 2, wherein
said heat and hydrogen generation device further comprises a switching device for switching an air flow route for feeding air from said burner into said burner combustion chamber between a high temperature air flow route for feeding air heated at said heat exchange part and a low temperature air flow route for feeding air lower in temperature than the air heated at said heat exchange part, and
said electronic control unit is programmed to switch the air flow route for feeding air from said burner into said burner combustion chamber from said high temperature air flow route to said low temperature air flow route when lowering the temperature of the air fed into said burner combustion chamber.

4. The heat and hydrogen generation device as claimed in claim 1, wherein said electronic control unit is programmed to determine that the temperature of the reformer catalyst will exceed said allowable catalyst temperature when the primary warm-up operation is switched to the secondary warm-up operation and thereby lower the temperature of the air fed from said burner into said burner combustion chamber.

5. The heat and hydrogen generation device as claimed in claim 1, wherein at the time of said primary warm-up operation, the $O_2/C$ molar ratio of the air and fuel which are made to react is made 2.0 to 4.0.

6. The heat and hydrogen generation device as claimed in claim 1, wherein at the time of said secondary warm-up operation, the $O_2/C$ molar ratio of the air and fuel which are made to react is made 0.5 to 0.56.

7. The heat and hydrogen generation device as claimed in claim 1, wherein said electronic control unit is programmed to switch to said secondary warm-up operation if the temperature of said reformer catalyst exceeds a predetermined temperature when said primary warm-up operation is being performed.

8. The heat and hydrogen generation device as claimed in claim 1, wherein said electronic control unit is programmed to switch to said secondary warm-up operation if the temperature of the air flowing out from the heat exchange part exceeds a predetermined temperature when said primary warm-up operation is being performed.

9. The heat and hydrogen generation device as claimed in claim 1, wherein said electronic control unit is programmed to switch an operating mode of the heat and hydrogen generation device to either a heat generating operating mode generating heat by performing a complete oxidation reaction by a lean air-fuel ratio and a heat and hydrogen generating operating mode generating heat and hydrogen by performing a partial oxidation reforming reaction by a rich air-fuel ratio.

* * * * *